March 2, 1971  A. C. OBORNE  3,566,723
CUTTING TOOL HOLDER
Filed Nov. 7, 1968
2 Sheets-Sheet 1
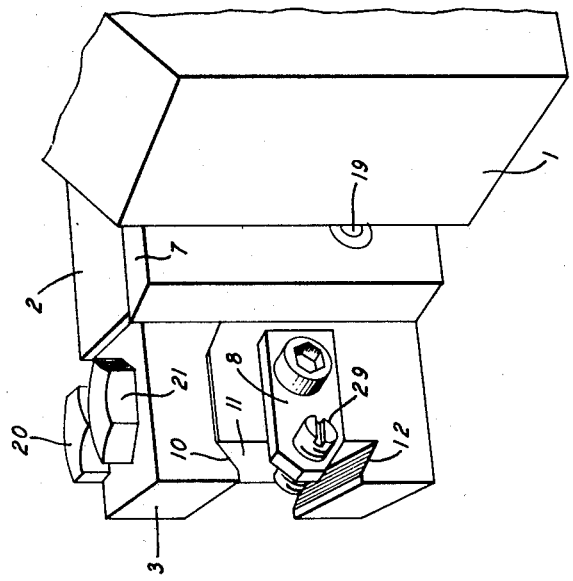
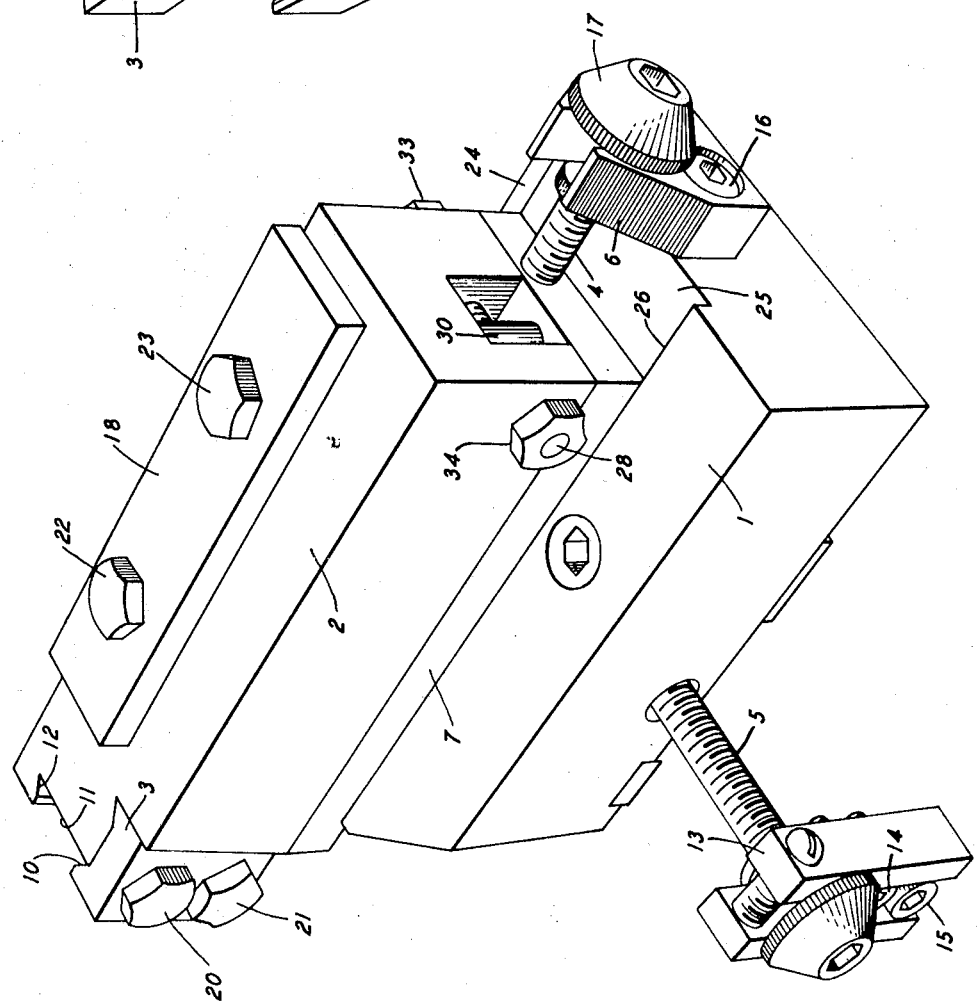
INVENTOR
ALFRED CARL OBORNE
BY
*Charles H. Rect*
ATTORNEY

INVENTOR
ALFRED CARL OBORNE
BY
ATTORNEY

United States Patent Office 3,566,723
Patented Mar. 2, 1971

3,566,723
CUTTING TOOL HOLDER
Alfred Carl Oborne, 84 Hopkinson Ave., Piscataway Township, Middlesex County, N.J. 08846
Filed Nov. 7, 1968, Ser. No. 774,093
Int. Cl. B23b 29/10
U.S. Cl. 82—36
4 Claims

ABSTRACT OF THE DISCLOSURE

A tool holder is disclosed for positioning a cutting tool against a workpiece. The holder includes facilities for adjustment of the tool so that it may be raised or lowered, and moved laterally, longitudinally and angularly with respect to the workpiece.

BACKGROUND OF THE INVENTION

This invention relates generally to tool holders and particularly to an improved tool adjustment assembly.

More specifically the invention concerns a holder for cutting tools of the type employed in automatic forming machines, such as the type used in mass producing a series of similar, interchangeable articles. In operation, the cutting tool usually ground to the particular profile shape of the finished article is automatically moved into and out of cutting relationship with a rotating workpiece and upon the termination of the cutting operation, new work material is engaged with the tool piece and the cycle is repeated. After a certain number of operations the tool piece requires sharpening and this process necessitates its removal from the holder. Thereafter, the sharpened tool is reinserted into the holder and realigned with the workpieces. Oftentimes, the sharpened bit is altered in the sharpening process and it does not properly line up with the work. As a result the holder assembly must be entirely readjusted and, in addition, oftentimes the tool piece must be shimmed or wedged to properly orient it with respect to the unfinished article. When the time required to realign the sharpened tool is inordinately long it adds appreciably to the cost of the finished article.

Therefore it is apparent there is a need to furnish a tool holder which is facilely adjustable to compensate for tool irregularity and to reduce "down" time when tool pieces are replaced.

Another object is to provide a tool holder which is suitable for all lathe operations and adjustable without the use of shims or the like.

STATEMENT OF THE INVENTION

In accordance with an illustrative embodiment of the invention a tool holder is furnished comprising three relatively adjustable sections. Importantly, the upper section includes a dovetail tool holder having an adjustable stop for lowering and raising the tool piece. This stop once having been adjusted to position a tool insures that a removed tool may be replaced to its original position in the holder without necessitating a complete realignment of the holder. The bottom section is adjustable for movement of the tool piece laterally and the middle, or intermediate, section is adjustable for longitudinal movement of the piece.

A salient feature of my invention is that the upper section is capable of being pivoted on an upstanding pin so that angular variations of the tool face may be corrected without the use of shims.

DESCRIPTION OF THE DRAWING

The features, objects and advantages of my invention will become more fully apparent after a presentation of the following description with reference to the drawing.

In the drawing:

FIG. 1 is a perspective view of the cutting tool holder,
FIG. 3 is a fragmentary view depicting the dovetail tool holder and the holder stop.

DETAILED DESCRIPTION

Figure 2:
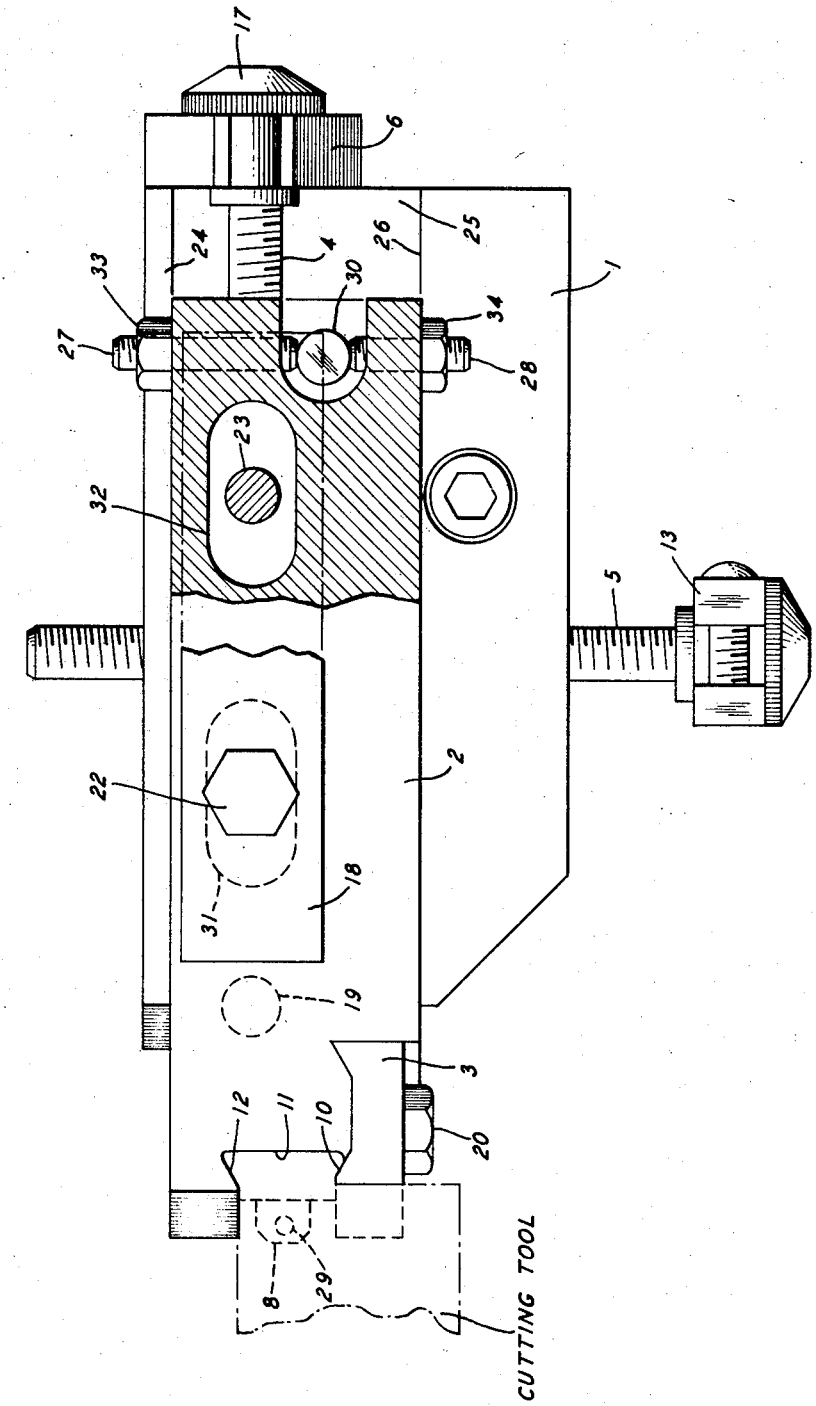
FIG. 2 is a top view showing in sectional views the upstanding pivot adjustment pin.

Referring now to FIGS. 1-3, the illustrative embodiment comprises a bottom section 1, and intermediate section 7 slideable mounted on section 1, and a top section 2 having a dovetail shaped tool holder. Bottom section 1 is slideable affixed to a work table (not shown) or the like and adjacent to a workpiece in a conventional manner. The position of section 1 with respect to the workpiece is only approximate and more precise positioning is facilely achieved in accordance with my invention by adjustment of either micrometer adjusting screw 4 or 5. Intermediate section 7 rests on section 1 and is located in a cut out portion formed by faces 24–26. The latter faces form a guide and restrict the movement of section 7 to longitudinal movement when horizontal micrometer adjusting screw 4 is turned. Top section 2 is supported on upstanding swivel pin 19 and by adjustment pin 30 which extend from section 7. Pins 19 and 30 are best viewed in FIG. 2. All three sections are held together by bolts 22 and 23 which pass through clear drills in each of the sections and screw into threaded inserts (not shown) under bottom section 1. Holes 31 and 32 in section 2 through which the aforementioned bolts 22 and 23 pass are elongated to allow for movement of section 2 with respect to the other sections as will be subsequently described. Bar 18 is necessary because of oversized holes 31 and 32 to give support for the heads of bolts 22 and 23.

The dovetailed tool support is formed by faces 10–12 of section 2. Face 10 is on movable tool support 3 which is held to the body of section 2 by bolts 20 and 21. In practice, the latter bolts are loosened allowing a tool to be inserted between faces 10–12 and subsequently bolts 20 and 21 are tightened to hold the tool piece firmly in place.

Stop 8 shown in FIG. 3 is situated at the bottom of the dovetail slot and it contains a threaded insert 29 which is, advantageously, adjustable to raise and lower the inserted tool. FIG. 1 shows a conventional tool demonstrating the dovetail end thereof which is inserted between faces 10–12. Once insert 29 has been set, a tool may be removed and replaced, and the stop 8 arrangement insures that it is replaced to the original tool position.

Turning our attention next to another salient aspect of this invention, the tool holder may be adjusted laterally, longitudinally, and angularly in addition to being raised and lowered by adjustment of stop 8 as discussed above.

Lateral adjustment is accomplished by turning adjusting screw 5. Screw yoke 13 is fastened to the work table (not shown) by threaded studs 14 and 15. A screw 5 is turned bottom section 1 is either drawn to or moved away from yoke 13 dependent upon the direction of turn. As all three sections are held together by bolts 22 and 23, turning screw 5 imparts a lateral movement to the tool held by top section 2.

The installed tool can be moved longitudinally and perpendicular to the axis of lateral movement by turning adjusting screw 4. The latter is supported by U-shaped member 6 and threads into intermediate section 7. When screw 4 is turned sections 7 and 2 jointly move relative to bottom section 1. It is to be noted that this movement is limited to movement within elongated holes 31 and 32 and also that bolts 22 and 23 may be loosened to facilitate movement of sections 2 and 7.

An important feature of my invention is that top section 2 can be pivoted on swivel pin 9 imparting what I term angular movement to the tool. The latter adjustment practically eliminates the need for shims or wedges which in the past were required anytime a tool was removed for sharpening and then replaced. The holder is initially setup using adjustment screws 4 and 5 and stop 8. When the tool is removed, sharpened and replaced in the dove tail holder, screws 4 and 5 may be adjusted once more. If, in sharpening process, the angle of the tool face is off by a ½ degree or more as occurs quite commonly in practice, advantageously, the tool is still useable in my holder and the error can be compensated for by the so called angular movement of top section 2 with respect to the lower sections of the holder.

Specifically, dependent upon the deviation of the tool from the desired angle either nut 33 or nut 34 is loosened and the opposite one of them is tightened causing top section 2 to swivel on pin 19 relative to intermediate section 7. When threaded studs 27 and 28 both touch adjustment pin 30 no further angular movement is possible. It is noted that this angular movement is contained by elongated hole 31 and 32 which because they are oversize for bolts 22 and 23 allow the angular compensation to be made. The embodiment shows that only a small angular adjustment is possible because of the size of holes 31 and 32, however, it is apparent that they could be enlarged allowing a greater angular correction to be made.

Another feature of this invention which is both practical and novel is the provision of screw yoke 13 for supporting adjusting screw 5. Oftentimes, in practice when the length of adjusting screw 5 is inordinately long, as may occur in certain installations, a craftsman in turning screw 5 to reposition the tool holder exerts sufficient force to bend screw 5. Yoke 13 prevents such an occurrence by confining the potential movement of the end of screw 5 thus preventing the unwitting destruction of the tool holder.

It is to be understood that the hereinbefore described arrangements are illustrative of the application of the principles of this invention. In light of this teaching, it is apparent that numerous other arrangements may be derived by those skilled in the art without departing from the spirit and scope of the invention.

What is claimed is:

1. A tool holder for supporting a tool engageable with a rotating article comprising:
    a bottom section having a threaded recess, a threaded rod in said recess and secured to a stationary yoke for laterally moving said section,
    an intermediate section slideably mounted on said bottom section, a threaded recess in said intermediate section and an adjusting screw therein secured at an end to said bottom section by a U-shaped member,
    a top section on said intermediate section, said intermediate section having an upstanding pin on which said top section is pivotally supported, a second upstanding pin on said intermediate section, said top section adjustably engaging said second pin for imparting angular movement to said top section, and
    a dovetail tool support at one end of said top section for holding a tool.

2. The invention set forth in claim 1 further including a stop in said tool support, and
    said stop includes an adjustable insert for raising and for lowering said tool in said support.

3. The invention set forth in claim 1 wherein said yoke includes members for confining the movement of said threaded rod to prevent bending of said rod.

4. The invention set forth in claim 1 wherein said bottom section, said intermediate section and top section have vertically aligned holes,
    vertical bolts through said holes for securing said sections together, and
    said top section holes being elongated to allow for movement of said top section relative to said intermediate and bottom sections.

References Cited
UNITED STATES PATENTS

| | | | |
|---|---|---|---|
| 1,230,032 | 6/1917 | Riddle | 82—36X |
| 1,807,999 | 6/1931 | McMurtry | 82—36X |
| 2,188,198 | 1/1940 | Bredenbeck | 82—36 |
| 2,281,706 | 5/1942 | Montgomery et al. | 82—36 |
| 3,160,038 | 12/1964 | Wood | 82—24X |

LEONIDAS VLACHOS, Primary Examiner